(12) United States Patent
Yamashita et al.

(10) Patent No.: US 6,377,979 B1
(45) Date of Patent: Apr. 23, 2002

(54) MULTIPLE-PROCESSOR SYSTEM AND METHOD FOR TRANSFERRING DATA AND/OR A PROGRAM STORED IN ONE PROCESSOR TO ANOTHER PROCESSOR IN ORDER TO PROCESS THE DATA OR TO EXECUTE THE PROGRAM THEREIN

(75) Inventors: Toshiro Yamashita; Toshiaki Shimoda; Tetsuya Takahashi, all of Kobe; Kazushige Harada, Tokyo, all of (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/210,646

(22) Filed: Dec. 14, 1998

(30) Foreign Application Priority Data

Dec. 25, 1997 (JP) .............................. 9-357105

(51) Int. Cl.[7] .......................................... G06F 15/167
(52) U.S. Cl. ...................................... 709/213; 709/208
(58) Field of Search ............................ 713/1; 709/213, 709/208, 102; 710/129, 261

(56) References Cited

U.S. PATENT DOCUMENTS

| | | | | |
|---|---|---|---|---|
| 5,109,329 A | * | 4/1992 | Strelioff ...................... | 710/261 |
| 5,361,362 A | * | 11/1994 | Benkeser et al. ........... | 709/102 |
| 5,412,803 A | * | 5/1995 | Bartow et al. .............. | 709/213 |
| 5,655,082 A | * | 8/1997 | Umekita et al. ............ | 709/213 |
| 5,951,683 A | * | 9/1999 | Yuuki et al. .................... | 713/1 |
| 5,987,506 A | * | 11/1999 | Carter et al. ................ | 709/213 |
| 6,018,782 A | * | 1/2000 | Hartmann .................... | 710/129 |
| 6,112,230 A | * | 8/2000 | Monch et al. .............. | 709/208 |
| 6,144,995 A | * | 11/2000 | Maya et al. ................. | 709/213 |

FOREIGN PATENT DOCUMENTS

JP        11-229357        9/1989

OTHER PUBLICATIONS

Separate–vol. of I/O, Research on use of FM–8, pp. 60–64, 250–251, 267.

* cited by examiner

Primary Examiner—Zarni Maung
Assistant Examiner—Jungwon Chang
(74) Attorney, Agent, or Firm—Reed Smith LLP (57) ABSTRACT

A multiple-processor system uses transfer blocks each having a size equal to or less than the capacity of a shared memory when transferring data from a master system to a slave system via the shared memory. Each transfer block includes a data to be transferred from the master system or a plurality of divisional data obtained by dividing the data to be transferred; information representing a writing-start address at which the data to be transferred or the plurality of divisional data starts to be written in storage for the slave system; and information representing the length of the data or the plurality of divisional data.

11 Claims, 5 Drawing Sheets

MULTIPLE-PROCESSOR SYSTEM AND METHOD FOR TRANSFERRING DATA AND/OR A PROGRAM STORED IN ONE PROCESSOR TO ANOTHER PROCESSOR IN ORDER TO PROCESS THE DATA OR TO EXECUTE THE PROGRAM THEREIN

BACKGROUND OF THE INVENTION

1. Field of the Invention

The present invention relates to multiple-processor systems that transfer data between a master system and a slave system via a shared memory.

2. Description of the Related Art

Figure 5:
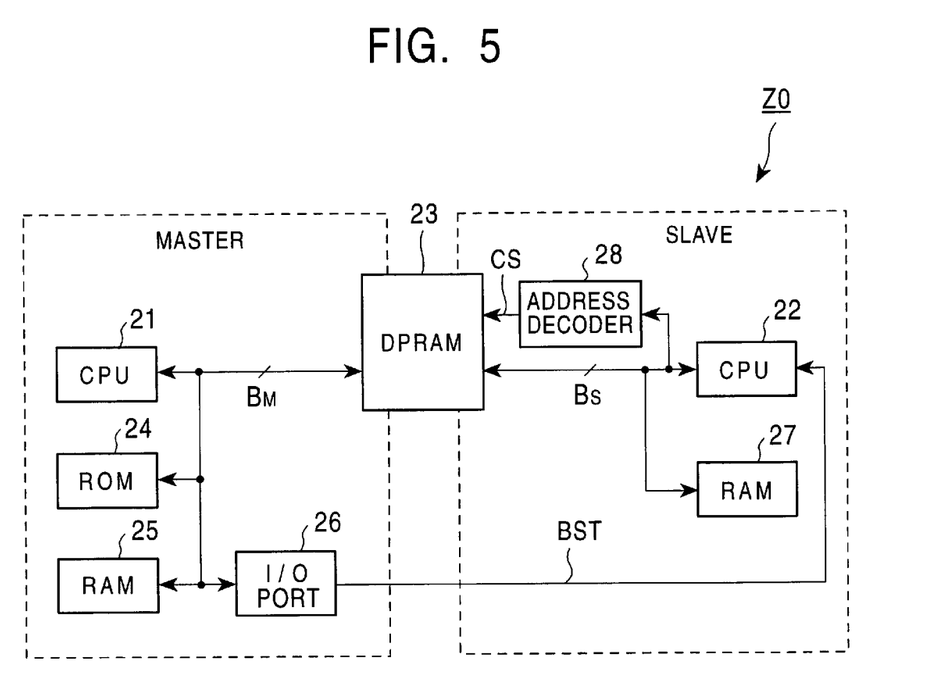
FIG. 5 is a block diagram showing an outline of a conventional multiple-processor system Z0.

A multiple-processor system that uses a dual-port memory (shared memory) having two input/output ports to transfer data between two central processing units (CPUs) is disclosed in, for example, Japanese Unexamined Patent Publication No. 8-161283. As shown in FIG. 5, in a multiple-processor system Z0 of the above-mentioned type, while a CPU 22 in a slave system (hereinafter referred to as a "slave CPU 22") is being reset, a CPU 21 in a master system (hereinafter referred to as a "master CPU 21") writes a boot-up program for the slave CPU 22 in a dual-port memory 23, and when the slave CPU 22 is free from its reset condition, it executes the boot-up program to boot. It is thereby possible for the slave system to have no read-only memory (ROM). The slave CPU 22 executes the boot-up program to repeatedly read and store data written in the dual-port memory 23 by the master CPU 21, in a random-access memory (RAM) 27. This enables transfer of data having a size greater than the capacity of the dual-port memory 23.

In the case where the multiple-processor system Z0 is used for an apparatus for reproducing compressed digital music data, a decoding program is stored in the RAM 27 of the slave system. In the slave system, by executing the decoding program, music data sequentially transferred from the master system are decoded to be reproduced. A decoding program for an audio compression algorithm, such as the "TwinVQ", includes a main program and table data attached thereto. In many cases, the main program and the table data are not stored in consecutive storage areas. The table data may be partially changed depending on, for example, a piece of included music. Accordingly, before reproducing each piece of music, it is most efficient to change a portion of the table data for the piece of music. The multiple-processor system Z0, which is conventional, employs a method in which when program transfer from the master system to the slave system is performed, a program to be transferred is divided into portions each having a size equal to or less than the capacity of the dual-port memory 23 so that sequential transfer of the portions from the beginning is simply performed. Thus, the overall program needs to be changed, even if the program is partially changed. This takes time and leads to a waste of electric power.

According to the multiple-processor system Z0, when data are transferred from the master system to the slave system, the master system transfers the data by using predetermined transfer addresses and data lengths. Thus, if the specifications of the slave system are modified, those of the master system must be modified, which cannot be easily performed.

SUMMARY OF THE INVENTION

Accordingly, it is an object of the present invention to provide a multiple-processor system in which when data are transferred from a master system to a slave system, partial data (program) in the slave system can be only modified, whereby the master system can be flexibly adapted for modification in the specifications of the slave system.

To this end, according to the present invention, the foregoing object has been achieved through provision of a multiple-processor system comprising: a master system including a central processing unit; at least one slave system including a central processing unit and a memory writable and readable thereby; and a shared memory accessed by both the central processing unit included in the master system and the central processing unit included in the slave system; the shared memory being used to perform data transfer from the master system to the slave system in units of transfer blocks each having a size not more than the capacity of the shared memory; wherein each transfer block includes a data to be transferred from the master system or a plurality of divisional data obtained by dividing the data to be transferred; information representing a writing-start address at which the data or the plurality of divisional data starts to be written in storage for the slave system; and information representing the length of the data or the plurality of divisional data.

Preferably, the data to be transferred is a predetermined program operating in the slave system and/or data to be processed by the predetermined program.

The predetermined program may be a decoding program, and the data to be processed may be compressed digital data obtained by encoding for compression.

The data to be processed may be audio data.

The slave system and the shared memory may be integrated into a single-chip large-scale integrated circuit.

According to a multiple-processor system of the present invention, when data to be processed are transferred, a slave system notifies a master system of the start address and length of each transfer block, whereby the master system is only required to form and send each transfer block as instructed by the slave system. Therefore, if the specifications of the slave system are modified, those of the master system do not need to be modified, and can be flexibly adapted for specification modification in the slave system.

According to a multiple-processor system of the present invention, when data transfer from a master system to a slave system, a start address and a data length are added to each transfer block having a size equal to or less than the capacity of a shared memory. Therefore, by way of example, when only part of a program in the slave-system storage is changed, only the part can be easily changed by transferring data on the part to be changed to a predetermined address. Thus, compared with a case in which the entire program is retransferred, a transfer period can be shortened and the power consumption can be reduced.

DESCRIPTION OF THE PREFERRED EMBODIMENTS

The following embodiments of the present invention will be described below with reference to the attached drawings. The technical scope of the present invention is not limited to the following embodiments.

Figure 1:
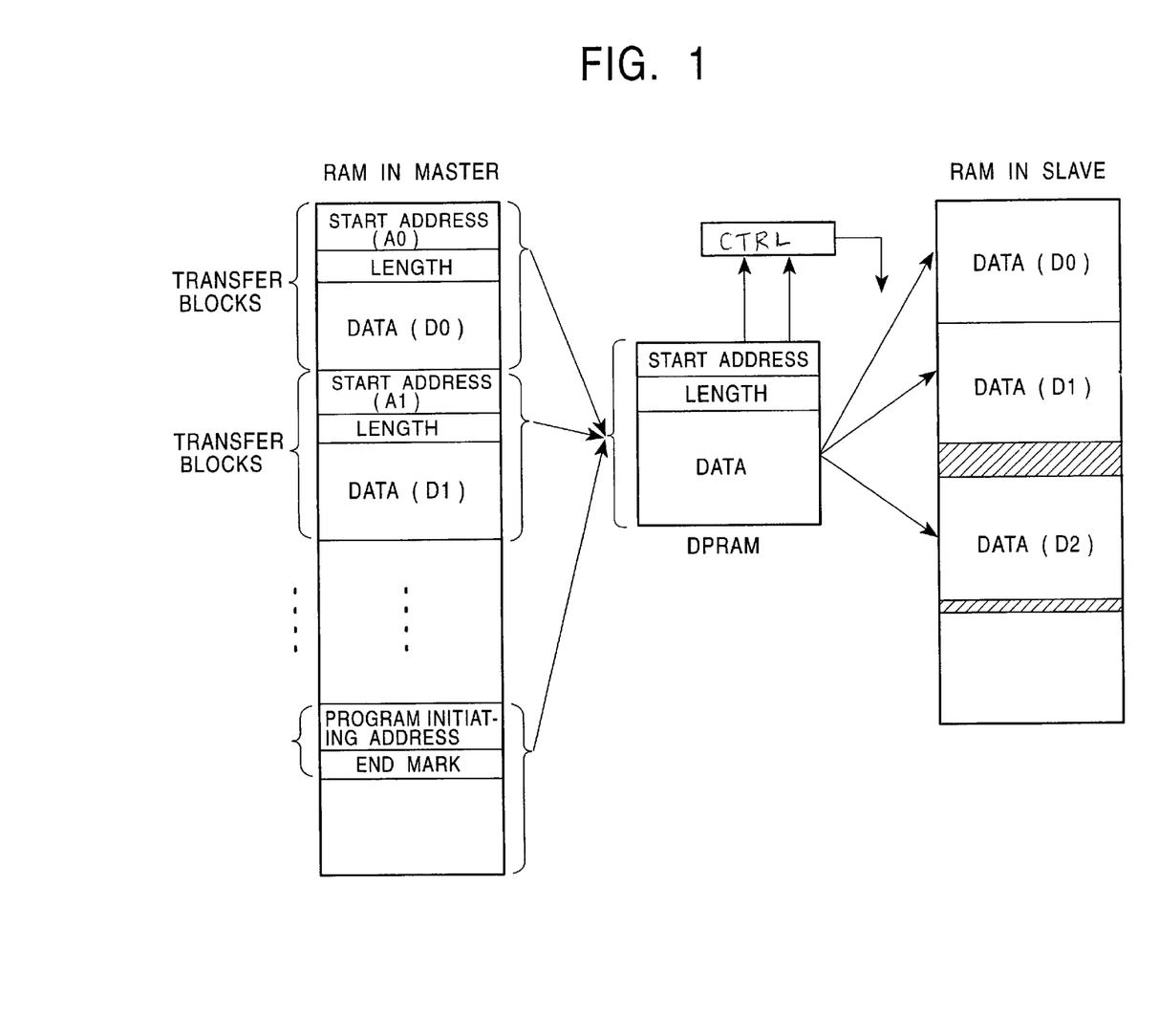
FIG. 1 is a drawing illustrating a form of data transfer from a master system to a slave system in a multiple-processor system Z1 according to an embodiment of the present invention, and transfer blocks used in the data transfer.
Figure 2:
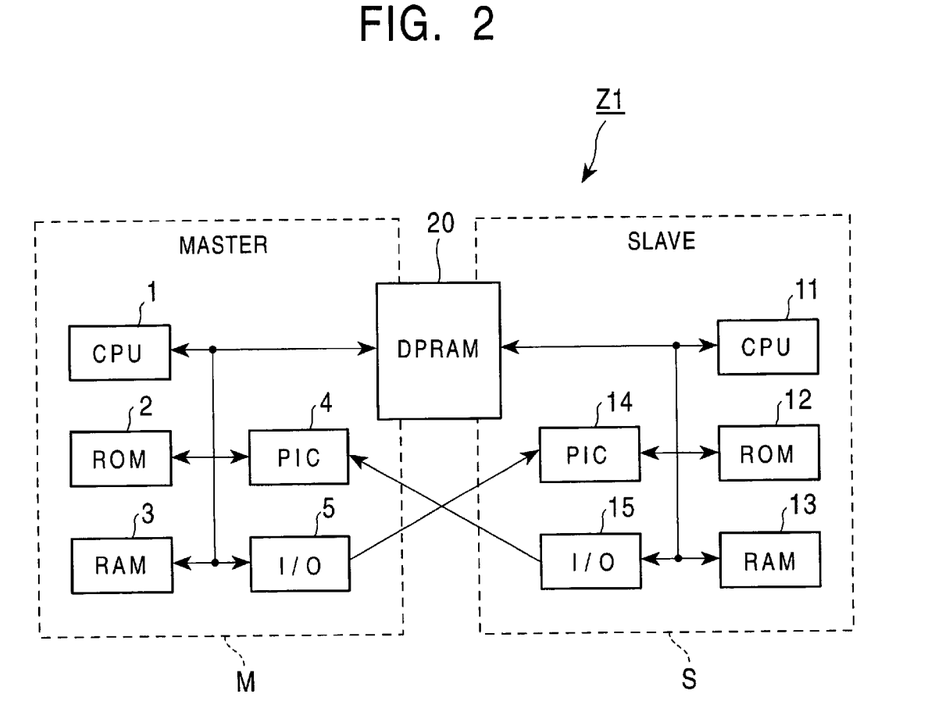
FIG. 2 is a block diagram showing an outline of a multiple-processor system Z1 according to an embodiment of the present invention.
Figure 3:
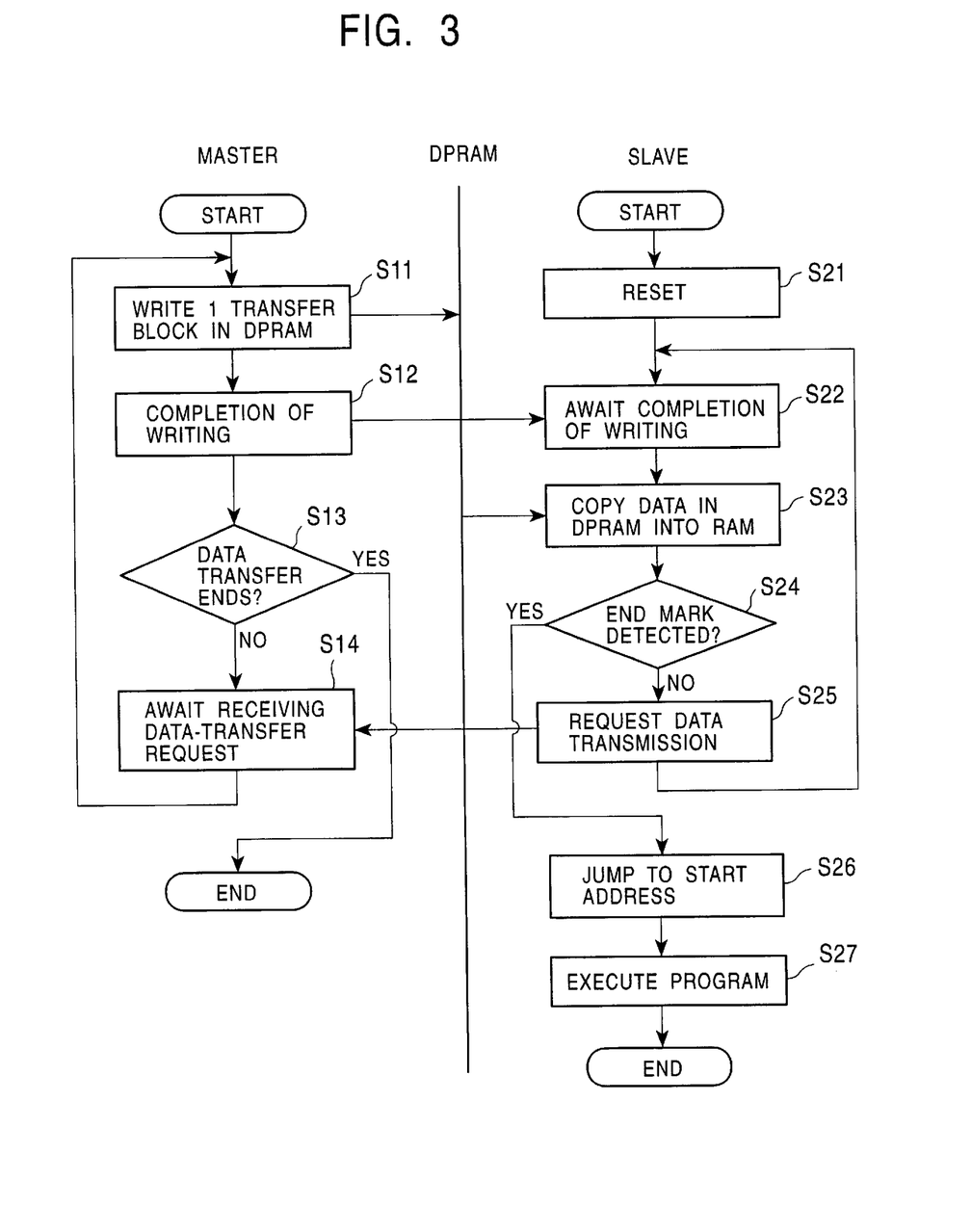
FIG. 3 is a flowchart showing a process for transferring a decoding program or modification data.
Figure 4:
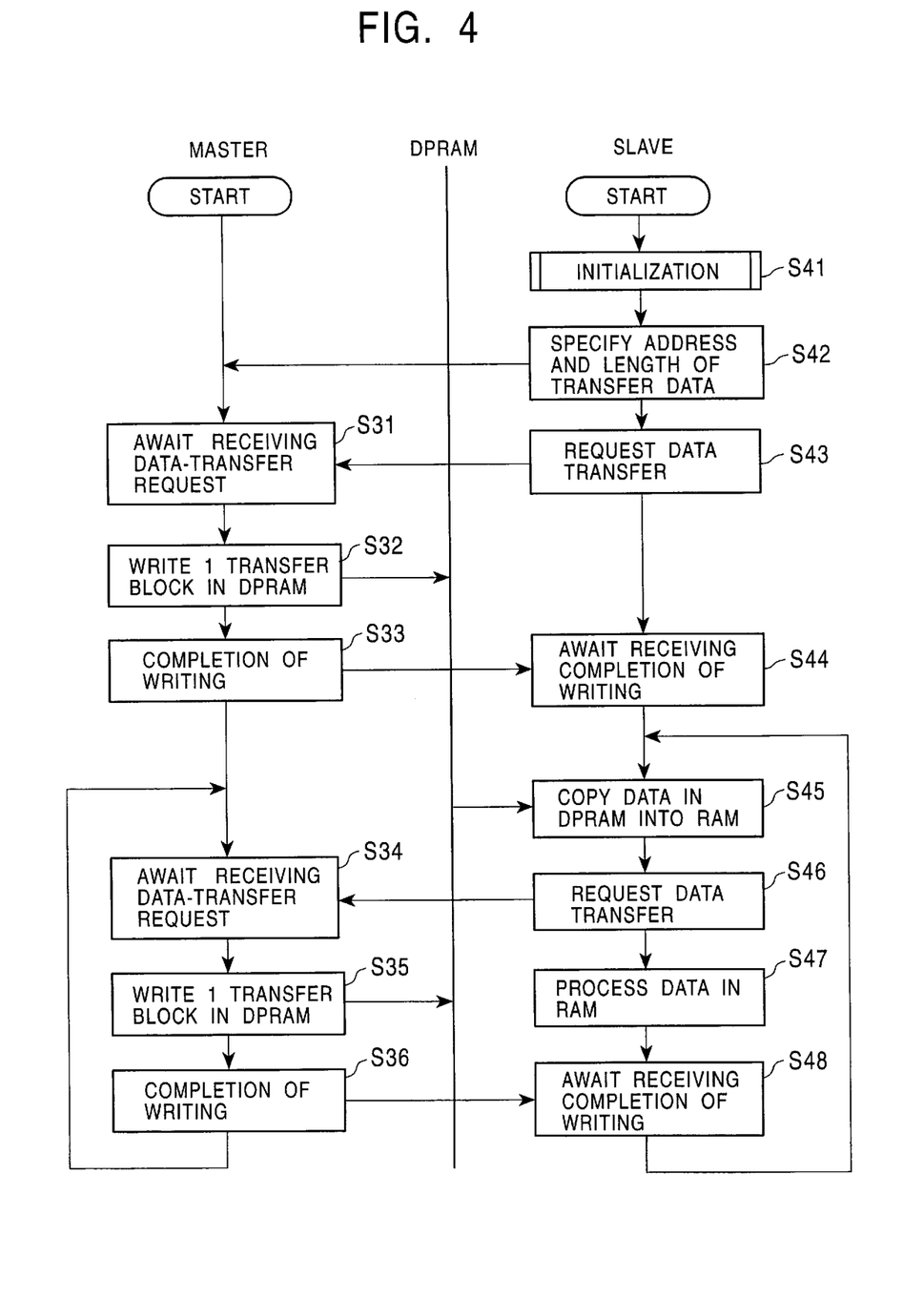
FIG. 4 is a flowchart showing a process for transferring music data.

FIG. 1 is a drawing illustrating a form of data transfer from a master system to a slave system in a multiple-processor system Z1 according to an embodiment of the present invention, and transfer blocks used in the data transfer. FIG. 2 is a block diagram showing an outline of the multiple-processor system Z1 according to the embodiment. FIG. 3 is a flowchart showing a process for transferring a decoding program or modification data. FIG. 4 is a flowchart showing a process for transferring music data.

This embodiment shows an application of the present invention to an apparatus for reproducing digital music data (one example of digital data).

As shown in FIG. 2, the multiple-processor system Z1 consists of: a master system M including a CPU (hereinafter referred to as a "master CPU") 1, a ROM 2, a RAM 3, a programmable interrupt controller (hereinafter referred to as a "PIC") 4, and an input/output (I/O) controller 5; and a slave system S including a CPU (hereinafter referred to as a "slave CPU") 11, a ROM 12, a RAM 13, a programmable interrupt controller 14, and an I/O controller 15; and a dual-port memory (hereinafter referred to as a "DPRAM") 20 for establishing the connection between the Master CPU 1 and the slave CPU 11. By connecting the PICs 4 and 14, and connecting the I/O controllers 5 and 15 as shown in FIG. 2, the synchronization between the master system M and the slave system S is established.

In the RAM 13 in the slave system S, a decoding program transferred via the DPRAM 20 is stored. The decoding program includes a main program and table data attached thereto. The table data have partially different values for pieces of music in music data to be decoded. In an area of the RAM 13, compressed music data sequentially transferred from the master system M via the DPRAM 20 are sequentially stored. The compressed music data sequentially stored in the RAM 13 are decoded to be reproduced based on the decoding program by the CPU 11. When a piece of music in the music data is switched, only modification data of the table data corresponding to the next piece of music is transferred from the master system M to the RAM 13 in the slave system S via the DPRAM 20, and only part of the table data is updated.

The transfer data are transferred from the master system M to the slave system S via the DPRAM 20 in units of transfer blocks as shown in FIG. 1, even if the type of the transfer data is a program (a main program and table data), modification data for the table data, or music data. Each transfer block consists of: divisional data (D0, D1, D2, . . . ) obtained by dividing the transfer data; information representing the start addresses (A0, A1, A2, . . . ) of the divisional data (D0, D1, D2, . . . ) in the RAM 13 in the slave system S; and information representing the lengths of the divisional data (D0, D1, D2, . . . ). Each transfer block has a data length equal to or less than the capacity of the DPRAM 20. Thus, a maximum data length of each transfer block is obtained by subtracting the total length of the two types of information from the capacity of the DPRAM 20. The data length of the last transfer block is set to zero (end mark). Based on this value of zero, the slave system S can recognize termination of the transferred data. Since each transfer block is provided with information on a start address and a data length as described above, only part of the decoding program can be easily changed, and a different parameter for each piece of music can be efficiently changed in an extremely short time.

Next, a data transfer process in the multiple-processor system Z1 will be described with reference to the flowcharts in FIGS. 3 and 4. For this description, the data transfer process is divided into transfer of a decoding program (main program and table data) or a modification data therefor, and transfer of music data.

TRANSFER OF DECODING PROGRAM OR MODIFICATION DATA FOR THE DECODING PROGRAM

A process for transferring a decoding program from the RAM 3 in the master system M to the RAM 13 in the slave lit system S via the DPRAM 20 is described referring to FIG. 3.

Initially, in the master system M, a decoding program to be transferred is divided into divisional data (D0, D1, D2, . . . ), and transfer blocks are formed in the RAM 3 beforehand by adding, to the divisional data, the start addresses (A0, A1, A2, . . . ) of the divisional data in the RAM 13 in the slave system S, and the lengths of the divisional data. The slave system S is reset to be stable (step S21) before the CPU 11 writes one of the transfer blocks in the DPRAM 20 (step S11). When the CPU 1 finishes writing, it sends a writing-completion signal to the slave CPU 11 by means of interruption or the like (step S12). In the case where the master system M has the next transfer block to send, the master system M awaits receipt of a data-transfer-request signal from the slave CPU 11 (step S14).

When the slave CPU 11 receives the writing-completion signal for the master CPU 1 (step S22), it reads the start address A0 and length of the first block among the blocks written in the DPRAM 20 by the master CPU 1, and successively reads divisional data D0 by the read length before copying it at start address A0 (step S23). If the data length is zero (step S24), the slave CPU 11 recognizes the value as an end mark, and jumps to start address A0 (step S26), in which the slave CPU 11 starts to execute the transferred decoding program (step S27). If the data length is not zero, the slave CPU 11 sends a signal for requesting transfer of next data by means of interruption or the like (step S25), and awaits completion of writing by the master CPU 1 (step S22).

When the master CPU 1 receives the signal for requesting transfer of next data (step S14), it writes one successive transfer block in the DPRAM 20 (step S11), and it sends a writing-completion signal to the CPU 11 by means of interruption or the like (step S12).

When the slave CPU 11 receives the writing-completion signal from the master CPU 1 (step S22), it copies, at address Al, the data written in the DPRAM 20 by the master CPU 1 (step S23).

Until transfer of the last transfer block ends, the master CPU 1 repeatedly performs steps S11 to S14, and the slave CPU 11 repeatedly performs steps S22 to S25.

The above-described embodiment shows a case in which the entire decoding program is transferred. However, the same method is used to transfer modification data for modifying table data included in the decoding program. Since a start address and a data length are specified for each transfer block as described above, divisional data (D0, D1, D2, . . . ) in each transfer block can be transferred to distributed areas in the RAM 13. Accordingly, in the case where part of the table data differs for each piece of music in the music data, it is possible to update the only part of the table data before data on the next piece of music is transferred. Thus, compared with a case in which the entirety of a program is updated in order to modify the table data, the transfer period can be shortened and power consumption can be reduced.

TRANSFER OF MUSIC DATA

Next, a process for transferring a music data that is reproduced in the slave system S, from the RAM 3 in the master system M to the RAM 13 in the slave system S via the DPRAM 20, is described with reference to FIG. 4.

Initially, before transferring the music data, the slave CPU 11 performs initialization (step S41). The slave CPU 11 successively notifies the master CPU 1 of the start address and length of music data to be transferred, and sends a data-transfer-request signal to the master CPU 1 (step S42).

When the master CPU 1 receives the data-transfer-request signal (step S31), it divides, based on the start address and length, music data to be transferred into divisional music data (D0, D1, D2, . . . ) as shown in FIG. 1, and adds start addresses (A0, A1, A2, . . . ) and lengths to the divisional music data (D0, D1, D2, . . . ) to form transfer blocks in the RAM 3 before writing one of the transfer blocks in the DPRAM 3 (step S32). When the master CPU 1 finishes writing to the DPRAM 3, it sends, to the slave CPU 11, a writing-completion signal by means of interruption or the like (step S33) before awaiting receipt of a data-transfer-request signal from the slave CPU 11 (step S34).

When the slave CPU 11 receives the writing-completion request from the master CPU 11 (step S44), it reads the first start address A0 and length among the data written in the DPRAM 20, and successively reads data D0 in the DPRAM 20 by the read length before copying data D0 at start address A0 (step S45). The slave CPU 11 sends a data-transfer-request signal to the master CPU 1 by means of interruption or the like (step S46), and successively processes (decodes or reproduces) the read music data in the RAM 13 (step S47).

When the master CPU 1 receives the data-transfer-request signal (step S34), it writes one successive transfer block in DPRAM 20 (step S35), and sends a writing-completion signal to the slave CPU 11 by means of interruption or the like (step S36).

When the slave CPU 11 receives the writing-completion signal from the master CPU 1 (step S48), it copies, at start address A1, the data written in the DPRAM 20 by the CPU 1 (step S45).

Until transfer of the last transfer block ends, and the processing of transferred music data ends, the master system M repeatedly performs steps S34 to S36, and the slave system S repeatedly performs steps S45 to S48.

As described above, when transfer of music data is performed, the slave system S notifies the master system M of the start address and length of music data to be transferred. Thus, the master system M is only required to form and send transfer blocks as instructed by the slave system S. Therefore, if the specifications of the slave system S are modified, those of the master system M do not need to be modified, and can be adapted for specification modification in the slave system S.

In the foregoing embodiment, the start address can be located either on the DPRAM 20 or on the RAM 13 in the slave system.

In the foregoing embodiment, a start addresses and a length are added to a transfer block. However, it is not necessary to add them. The slave system possesses those informations, because they are originally given by the slave system.

As described above, in a multiple-processor system Z1 according to the foregoing embodiment, when a program or data is sent from the master system M to the slave system S, a start address and a data length are added to each transfer block having a size equal to or less than the capacity of the DPRAM 20, whereby, for example, when only that part of a program in the slave-system RAM 13 is changed, only the part can be easily changed by transferring data on the part to be changed to a predetermined address. Thus, compared with a case in which the entire program is retransferred, a transfer period can be shortened and the power consumption can be reduced.

In addition, when transfer of music data is performed, the slave system S notifies the master system M of the start address and length of music data to be transferred. Thus, the master system M is only required to form and send transfer blocks as instructed by the slave system S. Accordingly, if the specifications of the slave system S are modified, those of the master system M do not need to be modified, and can be flexibly adapted for modification in the slave system S.

Moreover, the addition of the start address and data length to each transfer block provides the following possible effects.

In the case where the size of each transfer block is fixed, for example, transfer is performed with a shared memory (the DPRAM 20) size used as one block unit, a shared memory area that improperly corresponds to data to be transferred requires particular processing by a control program. In the case where only transfer of transfer blocks having the same size to particular addresses is performed, a method of fixing the size of each transfer block is useful. However, if the size of data to be transferred is not a simple integral multiple of one block, and the data terminates in one block, a protocol in accordance with such a case must be prepared. Conversely, according to the present invention, it is not necessary to consider such a specific case because transfer is performed while an address and a data length for each block are always being instructed. Therefore, the present invention can simplify a control program, compared with the case where the size of each transfer block is fixed.

In addition, according to the present invention, higher error-free rates than is conventional can be obtained. In data transfer, if an error occurs in one process, the error condition may persist. By way of example, when it is assumed that one address is shifted by some conditions, data are arranged with one address shifted thereafter. Without a special returning mechanism, there is no recovery from this condition. In contrast, according to the present invention, an address and a data length for each block are always instructed. This prevents an error in one transfer block from affecting another block. Accordingly, it may be said that the present invention provides relatively strong protection against errors.

Moreover, according to the present invention, transfer-address-and-size information is always written in the DPRAM 20. Based on the transfer-address-and-size information, the position of data and its content can be easily specified. Whenever the slave system S copies data from DPRAM 20 to the RAM 13, using the transfer-address-and-size information to compare data in the DPRAM 20 and the copied data, a verifying function can be realized. In addition, the storage area of the slave system S can be arbitrarily changed from the-master system M. Thus, the master system M finely controls the slave system S to operate at high speed.

In a multiple-processor system Z1 according to the foregoing embodiment, the slave system S and the DPRAM 20 may be integrated into a single-chip LSI circuit.

In the foregoing embodiments, a case in which the present invention is applied to an apparatus for reproducing music data (sound data) has been described. However, digital information to be processed is not limited to sound data, but may be various types of information such as still pictures, moving pictures, and typographical information.

What is claimed is:

1. A multiple-processor system for transferring at least one of data and a program stored in one master system to at least one slave system to process the data or execute the program for the master system therein, comprising:

the master system including a central processing unit and a memory writable and readable thereby;

the at least one slave system including a central processing unit and a memory writable and readable thereby; and a shared memory accessed by both the central processing unit included in said master system and the central processing unit included in said slave system, said shared memory being used to transfer at least one of the data and the program from said memory in said master system to said memory in said slave system in units of transfer blocks each having a size not more than the capacity of said shared memory, wherein each transfer block includes:

the data or the program to be transferred from said master system or a plurality of divisional data obtained by dividing said data or program to be transferred;

information representing a writing-start address at which said data or program or said plurality of divisional data starts to be written in said memory in said slave system; and information representing the length of said data or program or said plurality of divisional data, and the slave system is operatively formed to initiate the transferring of at least one of data and a program from the master system in order to process the data or execute the program for the master system therein.

2. A multiple-processor system according to claim 1, wherein said data to be transferred is a predetermined program operating in said slave system.

3. A multiple-processor system according to claim 2, wherein said predetermined program is a decoding program.

4. A multiple-processor system according to claim 1, wherein said slave system and said shared memory are integrated into a single-chip large-scale integrated circuit.

5. A multiple-processor system for transferring at least one of data and a program stored in one master system to at least one slave system to process the data or execute the program for the master system therein, comprising:

the master system including a central processing unit and a memory writable and readable thereby;

the at least one slave system including a central processing unit and a memory writable and readable thereby; and a shared memory accessed by both the central processing unit included in said master system and the central processing unit included in said slave system, said shared memory being used to transfer at least one of the data and the program from said memory in said master system to said memory in said slave system in units of transfer blocks each having a size not more than the capacity of said shared memory, wherein the slave system is operatively formed to initiate the transferring of at least one of the data and the program from the master system in order to process the data or execute the program for the master system therein, and when said data or program is transferred, said slave system notifies said master system of the writing-start address at which said data start to be written in said memory in said slave system or said shared memory and of the length of each of said transfer blocks.

6. A multiple-processor system according to claim 5, wherein said data is compressed digital data obtained by encoding for compression.

7. A multiple-processor system according to claim 6, wherein said data to be processed is audio data.

8. A multiple-processor system according to claim 5, wherein said slave system and said shared memory are integrated into a single-chip large-scale integrated circuit.

9. A multiple-processor system according to claim 5, wherein said CPU in said master system divides data to be transferred in said memory in said master system into divisional data of said length.

10. A multiple-processor system for transferring at least one of data and a program stored in one master system to at least one slave system to process the data or execute the program for the master system therein, comprising:

the master system including a central processing unit and a memory writable and readable thereby;

the at least one slave system including a central processing unit and a memory writable and readable thereby; and a shared memory accessed by both the central processing unit included in said master system and the central processing unit included in said slave system, said shared memory being used to transfer at least one of the data and the program from said memory in said master system to said memory in said slave system in units of transfer blocks each having a size not more than the capacity of said shared memory;

wherein each transfer block for a predetermined program operating in said slave system includes:

the program to be transferred from said master system or a plurality of divisional data obtained by dividing said program to be transferred;

information representing a writing-start address at which said program or said plurality of divisional data starts to be written in said memory in said slave system; and information representing the length of said program or said plurality of divisional data;

the slave system is operatively formed to initiate the transferring of at least one of data and a program from the master system in order to process the data or execute the program for the master system therein, and wherein said slave system is operatively connected such that, when data to be processed in said slave system using said predetermined program is transferred, said slave system notifies said master system of a writing-start address at which said data starts to be written in said memory in said slave system in said shared memory and of a length of each of said transfer blocks for said data processed in said slave system.

11. A multiple-processor system for transferring at least one of data and a program stored in one master system to at least one slave system to at least one of process the data and execute the program for the master system therein, comprising:

the master system including a central processing unit and a memory writable and readable thereby;

the at least one slave system including a central processing unit and a memory writable and readable thereby; and a shared memory accessed by both the central processing unit included in said master system and the central processing unit included in said slave system, said shared memory being used to transfer at least one of the data and the program from said memory in said master system to said memory in said slave system in units of transfer blocks each having a size not more than the capacity of said shared memory, wherein each transfer block for a predetermined program operating in said slave system includes:

the program to be transferred from said master system or a plurality of divisional data obtained by dividing said program to be transferred, information representing a writing-start address at which said program or said plurality of divisional data starts to be written in said memory in said slave system, and information representing the length of said program or said plurality of divisional data;

the slave system is operatively formed to initiate the transferring of at least one of data and a program from the master system in order to process the data or execute the program for the master system therein, and said slave system is operatively connected to notify said master system of a writing-start address at which said data starts to be written in said memory in said slave system in said shared memory and of a length of each of said transfer blocks for said data processed in said slave system, when data to be processed in said slave system using said predetermined program is transferred.

* * * * *